(12) United States Patent
Maeoka et al.

(10) Patent No.: US 7,734,919 B2
(45) Date of Patent: Jun. 8, 2010

(54) TELEPHONE HAVING AUTHENTICATION FUNCTION AND TELEPHONE SYSTEM

(75) Inventors: Jun Maeoka, Kawasaki (JP); Toru Nagura, Chiasaki (JP); Toshimitsu Hayashi, Zama (JP); Yosuke Saso, Tachikawa (JP); Hideki Nakamura, Yokohama (JP); Shinichiro Kawasaki, Kawasaki (JP); Motoaki Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1297 days.

(21) Appl. No.: 10/942,935

(22) Filed: Sep. 17, 2004

(65) Prior Publication Data

US 2005/0216741 A1 Sep. 29, 2005

(30) Foreign Application Priority Data

Mar. 24, 2004 (JP) ............................. 2004-085962

(51) Int. Cl.
*H04L 9/00* (2006.01)
(52) U.S. Cl. ...................................... 713/169; 713/176
(58) Field of Classification Search ................. 713/176, 713/169, 184; 283/13; 382/276–308; 726/28, 726/29; 380/270
See application file for complete search history.

(56) References Cited

U.S. PATENT DOCUMENTS

2002/0194121 A1* 12/2002 Takayama .................... 705/39

2006/0098678 A1* 5/2006 Tan ............................ 370/441

FOREIGN PATENT DOCUMENTS

| JP | 2001-053862 | 2/2001 |
|----|-------------|--------|
| JP | 2001-256497 | 9/2001 |

* cited by examiner

*Primary Examiner*—Gilberto Barron, Jr.
*Assistant Examiner*—Hadi Armouche
(74) *Attorney, Agent, or Firm*—Antonelli, Terry, Stout & Kraus, LLP.

(57) ABSTRACT

An information processing terminal includes a calculation processing unit, a telephone communication processing unit for performing a telephone communication with respect to another appliance, a communication processing unit for performing a communication operation with respect to the another appliance, and a signature calculating unit in which when a telephone communication with respect to the above-described another appliance is carried out, a signature using a secret key is produced by the calculation processing unit, and the signature calculating unit produces information attached with signature to which the produced signature has been attached. In the information processing terminal, the telephone communication processing unit transmits the information attached with signature to the another appliance corresponding to a telephone calling destination. It then becomes possible to notify that a telephone communication counter party is a justified user of an appliance before the telephone communication is commenced.

14 Claims, 14 Drawing Sheets

FIG. 4

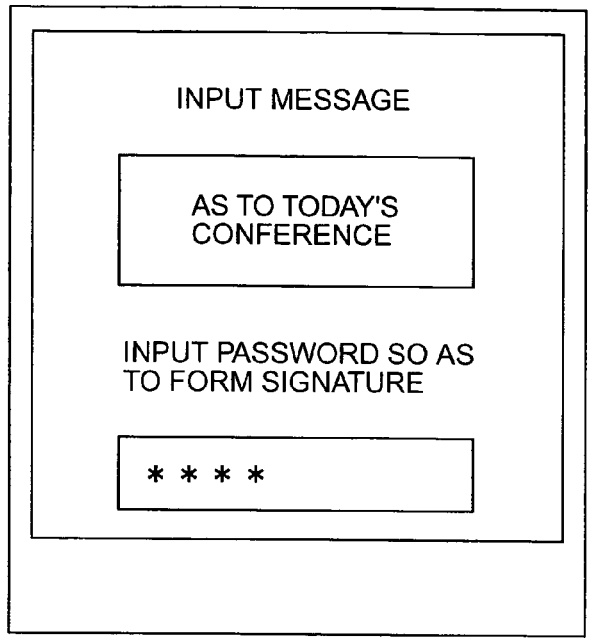

INPUT MESSAGE

AS TO TODAY'S CONFERENCE

INPUT PASSWORD SO AS TO FORM SIGNATURE

| TELEPHONE NUMBER OF TELEPHONE CALLING SOURCE | AUTHENTICATION REQUIRE/NOT REQUIRE | OPERATION WHEN AUTHENTICATION IS PERFORMED | OPERATION WHEN AUTHENTICATION IS NOT PERFORMED |
|---|---|---|---|
| 090 12345678 | REQUIRE | TELEPHONE CALLING TONE | TELEPHONE ANSWERING MEMORANDUM |
| 090 98765432 | REQUIRE | VIBRATOR | REFUSE TELEPHONE CALL |
| 090 00000000 | REQUIRE | TELEPHONE ANSWERING MEMORANDUM | REFUSE TELEPHONE CALL |
| 090 11111111 | NOT REQUIRE | TELEPHONE CALLING TONE | TELEPHONE CALLING TONE |
| OTHER | REQUIRE | TELEPHONE ANSWERING MEMORANDUM | TELEPHONE ANSWERING MEMORANDUM |

FIG. 8

SIGNATURE HAS BEEN REQUESTED FROM TELEPHONE CALL RECEIVING DESTINATION TRANSMISSION OF SIGNATURE IS REQUIRED FOR TELEPHONE COMMUNICATION

ENTER PASSWORD SO AS TO FORM SIGNATURE

TELEPHONE CALL ATTACHED
WITH SIGNATURE AUTHENTICATION
REQUEST HAS BEEN RECEIVED
FROM 09012345678

ENTER PASSWORD SO AS
TO FORM SIGNATURE

* * * *

TELEPHONE HAVING AUTHENTICATION FUNCTION AND TELEPHONE SYSTEM

INCORPORATION BY REFERENCE

The present application claims priority from Japanese application JP 2004-085962 filed on Mar. 24, 2004, the content of which is hereby incorporated by reference into this application.

BACKGROUND OF THE INVENTION

The present invention relates to an information processing terminal and an information communication system. More specifically, the present invention is directed to a telephone which is communicated/telephoned with a communication counter terminal, and a telephone system.

Conventionally, telephones and telephone number display systems, capable of displaying telephone numbers of telephone calling sources when telephone calls are received, have been marketed. Also, in the telephone described in JP-A-2001-53862, such a message display telephone system is disclosed which transmits a message of a telephone calling person while a telephone communication is established.

SUMMARY OF THE INVENTION

In a telephone number display system, a telephone number is notified to a call receiving end of a telephone every time a telephone call is made, and thus, the telephone of the call receiving end displays thereon the received telephone number. In such a telephone number display system, it is desirable that a person who makes a telephone call can be specified. Also, it is desirably possible to avoid such a spoofing operation that a third party spoofs as a true owner of a lost telephone. Further, in a message display telephone system, a person who issues a telephone call enters a message. In such a message display telephone system, it is desirably possible to specify on the telephone reception side such a fact that while a third party spoofs as a true owner of this message display telephone, this third party enters a message.

The present invention has therefore an object to provide a telephone system capable of strictly authenticating a counter party, or a person at the other end under telephone communication.

An information processing terminal, according to the present invention, is featured by comprising: an input appliance for accepting an input of a user; an output appliance for displaying information with respect to the user; a communication appliance with respect to another appliance; and a telephone communication appliance with respect to the above-described another appliance; and further, a signature forming function; in which while information is exchanged when a telephone communication is commenced, a signature is formed by the signature forming function, and signature information is transmitted. As a result, before the telephone communication is commenced, the information processing terminal can notify that the counter party of the telephone communication corresponds to the correct user of the communication appliance.

Also, an information processing terminal, according to the present invention, is featured by comprising: a transmitting/receiving appliance which is communicated to another information appliance; in which while information is exchanged when a telephone communication is commenced, the information processing terminal verifies data to which a signature has been added, and performs a telephone call receiving operation in response to a verification result. As a consequence, before the telephone communication is commenced, the information processing terminal can specify the person who issues the telephone communication.

Also, an information processing terminal, according to the present invention, is featured by comprising: a transmitting/receiving appliance which is communicated to another information appliance; in which with respect to a telephone communication request issued from another information processing terminal, the information processing terminal requests to transmit authentication information, and verifies the authentication information transmitted from the above-described information appliance. As a consequence, before the telephone communication is commenced, the information processing terminal can request the authentication information which specifies the person who issues the telephone communication.

Also, an information processing terminal, according to the present invention, is featured by comprising: an input appliance for accepting an input from a user; and an output appliance for displaying information to the user; and further, a first communication appliance, a second communication, or telephone communication appliance, and also, a signature forming function; in which: prior to either a communication operation or a telephone communication executed in the second communication or telephone communication appliance, a signature is formed by the signature forming function; the first communication appliance transmits the signature; and a commencement of either the telephone communication or the communication operation is accepted via an appliance of a transmission source via the second communication or telephone communication appliance. As a result, before the telephone communication is commenced, the information processing terminal can notify that the counter party of the telephone communication corresponds to the justified user of the communication appliance, and further, can start the telephone communication from the telephone communication destination.

Also, an information processing terminal, according to the present invention, is featured by comprising: a transmitting/receiving appliance which is communicated to another information appliance; and further, a first communication appliance, a second communication, or telephone communication appliance, and also, a signature forming function; in which: the information processing terminal receives a signature transmitted from the above-described another information appliance via the first communication appliance, and verifies the received signature; in response to the verification result, either a telephone communication or a communication operation is commenced by the second communication, or telephone communication appliance with respect to the information appliance of the transmission source. As a consequence, before the telephone communication is commenced, the information processing terminal can specify the person who issues the telephone communication, and furthermore, can commence the telephone communication.

Also, an information processing terminal, according to the present invention, is featured by comprising: an input appliance for accepting an input from a user; and an output appliance for displaying information to the user; and further, a first communication appliance, a second communication, or telephone communication appliance, and also, a signature forming function; in which: prior to either a communication operation or a telephone communication executed in the second communication or telephone communication appliance, a signature is formed by the signature forming function; the first communication appliance transmits the signature; and either the telephone communication or the communication operation is commenced the second communication or telephone communication appliance by receiving a resend message from an appliance of a transmission destination.

As a result, before the telephone communication is commenced, the information processing terminal can notify that the counter party of the telephone communication corresponds to the justified user of the communication appliance.

Also, an information processing terminal, according to the present invention, is featured by comprising: a transmitting/receiving appliance which is communicated to another information appliance; and further, a first communication appliance, a second communication, or telephone communication appliance, and also, a signature forming function; in which: the information processing terminal receives a signature transmitted from the above-described another information appliance via the first communication appliance, and verifies the received signature; in response to the verification result, information as to a verification completion is resent to the information appliance of the transmission source by a first communication means; and a start request of either the telephone communication or the communication operation is accepted from the information appliance of the transmission source via a second communication, or telephone communication means. As a consequence, before the telephone communication is commenced, the information processing terminal can confirm the telephone communication counter party.

Also, an information processing terminal, according to the present invention, is featured by comprising: an input appliance for accepting an input of a user; an output appliance for displaying information with respect to the user; and a communication, or telephone communication appliance with respect to another appliance; and further, a signature forming function; in which: prior to either a communication operation or a telephone communication executed in the second communication or telephone communication appliance, a signature is formed by the signature forming function in response to an authentication information request issued from the above-described another appliance; and signature information is resent via the second communication, or telephone communication appliance. In addition to the signature information, the information processing terminal encrypts secret information and resends the encrypted secret information. As a result, the information processing terminal can notify the justified user of the communication appliance during the telephone communication, and can transmit the secret information.

Also, an information processing terminal, according to the present invention, is featured by comprising: a transmitting/receiving appliance which is communicated to another information appliance; and further, a signature verification function; in which: the information processing terminal transmits a request of authentication information to the above-described another information appliance, and verifies a resent signature. As a result, the information processing terminal can confirm the telephone communication destination while the telephone communication operation is carried out.

Also, an information processing terminal, according to the present invention, is featured by comprising: an input appliance for accepting an input of a user; an output appliance for displaying information with respect to the user; and a communication, or telephone communication appliance with respect to another appliance; and further, a signature forming function; in which: while information is exchanged when a telephone communication is commenced, the information processing terminal requests authentication information of a telephone communication destination, verifies the authentication information resent from the telephone communication destination, and also, judges as to whether or not the telephone communication is allowed in response to a verification result. As a consequence, the information processing terminal can firmly designate a person of the desired telephone communication source.

Also, an information processing terminal, according to the present invention, is featured by comprising: an input appliance for accepting an input of a user; an output appliance for displaying information with respect to the user; and a communication, or telephone communication appliance with respect to another appliance; and further, a signature forming function; in which: the information processing terminal accepts a telephone communication request from a telephone communication source, accepts an authentication information request from the telephone communication source while information is exchanged when the telephone communication is commenced, and produces signature information so as to resend the produced signature information to the telephone communication source.

As a consequence, after the justified user of another information processing terminal can be certified when the telephone communication is commenced, the information processing terminal can accept the telephone communication.

In the telephone and the telephone system, according to the present invention, the counter party of the telephone communication can be strictly confirmed by employing the reliable public certification.

BRIEF DESCRIPTION OF THE DRAWINGS

FIG. 4 is a diagram for illustratively representing a display screen example as to a message input screen (embodiment 1).

FIG. 5 is a diagram for indicating a data structure of a telephone call receiving condition.

FIG. 8 is a diagram for showing a display screen example as to a signature request screen (embodiment 2).

FIG. 17 is a diagram for illustratively representing a display screen example as to a signature requesting screen (embodiment 6).

DESCRIPTION OF THE EMBODIMENTS

Figure 1:
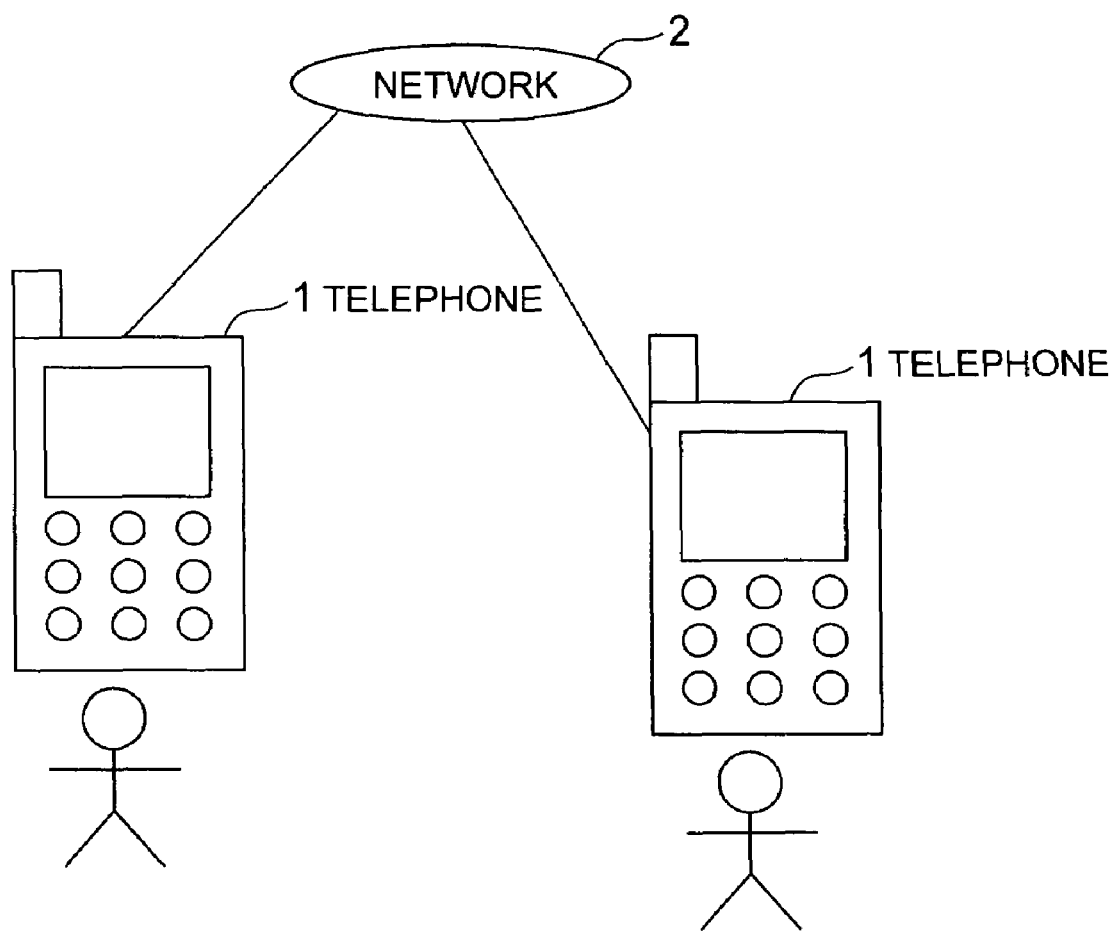
FIG. 1 is a diagram for illustratively showing a telephone system according to an embodiment of the present invention.

Referring now to drawing, various embodiments of a telephone system according to the present invention will be described. It should be understood that since same reference numerals will be employed as those for indicating structural elements which are commonly used in descriptions of these embodiments, explanations as to these commonly used structural elements are omitted.

FIG. 1 shows a structural diagram of a telephone system according to an embodiment of the present invention. In this telephone system, a telephone 1 is connected via a network 2 to another telephone 1, so that a telephone communication and/or a communication operation can be carried out between these telephones 1 with each other, for instance, a mutual telephone communication can be performed and an e-mail (electronic mail) can be transmitted/received. Although the telephone 1 corresponds to, for instance, such an information processing terminal as a portable telephone and a home-use telephone, the present invention is not limited only these information processing terminals, but may be alternatively realized by other information terminals capable of performing telephone communications and communications. Although the network 2 corresponds to, for example, a fixed telephone network, a portable telephone network, and the Internet, the present invention is not limited only to these networks, but may be alternatively realized by such communication means capable of performing telephone communications and/or communications with each other.

Figure 2:
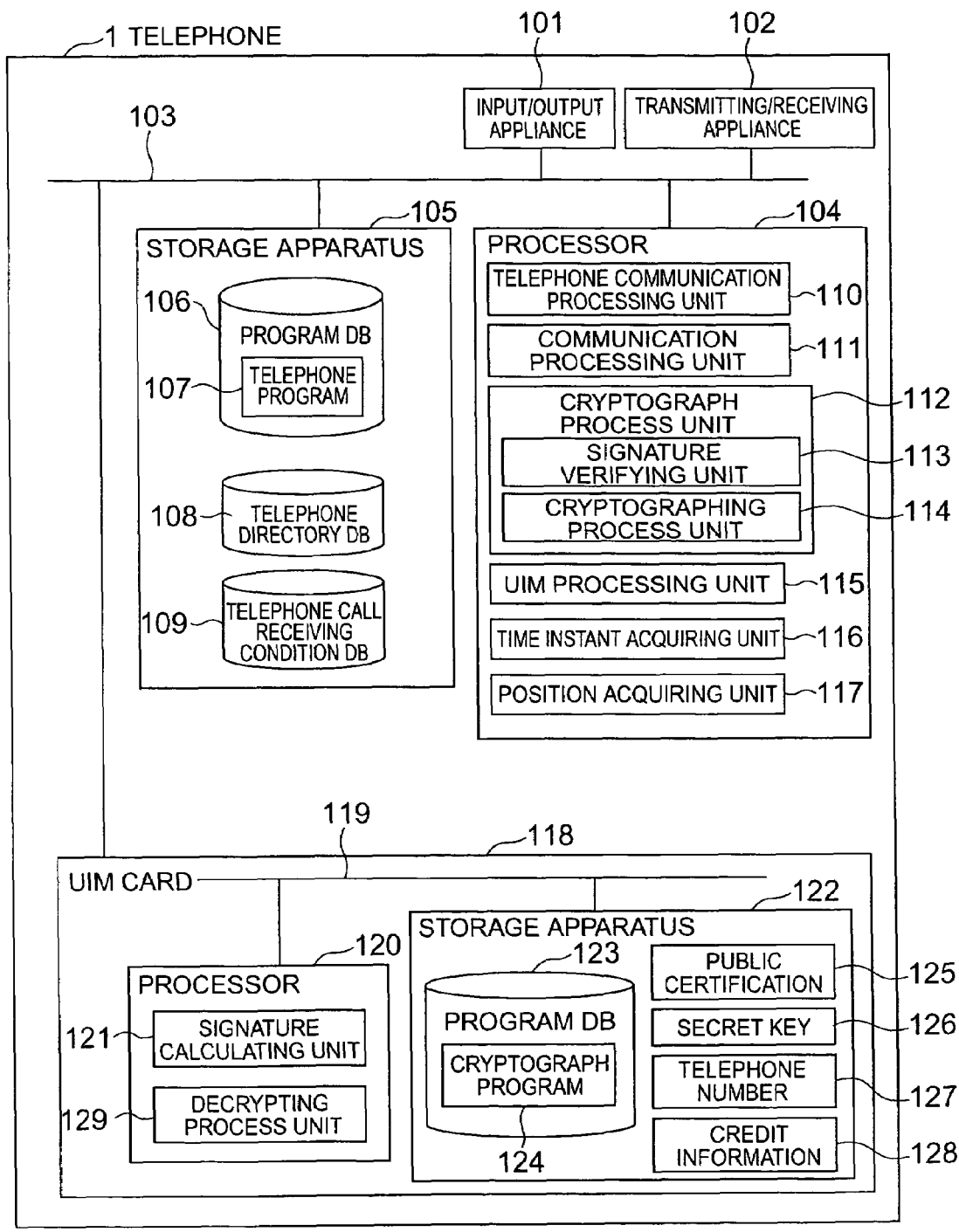
FIG. 2 is a diagram for schematically indicating an internal arrangement of a portable terminal employed in the telephone system shown in FIG. 1.

FIG. 2 schematically shows an internal arrangement of the telephone 1 according to this embodiment. An input/output appliance 101, a transmission/reception appliance 102, a processor 104, a storage apparatus 105, and a UIM (User Identity Module) card 118 are connected via an internal bus 103 to each other so as to transmit/receive control signals, data, and the like among these structural components. The respective components are connected to a battery, or a power supply, so that electric power required for driving these components may be supplied. The storage apparatus 105 corresponds to, for example, a hard disk drive, namely, an apparatus capable of storing thereinto information. Although the input/output appliance 101 corresponds to, for instance, a liquid crystal display and a ten-numeral entry key, which display information to a user and also accept a data input from a user, the present invention is not limited only thereto, but may be alternatively realized by an apparatus capable of accepting an input from a user and of outputting to a user. Alternatively, this input/output appliance 101 may be arranged by separately providing an input appliance and an output appliance. The transmission/reception appliance 102 controls both the network 2 and the communication to receive data and then transfers the received data to the processor 104 during a reception operation. Also, the transmission/reception appliance 102 receives data from the processor 104, and then transmits the received data to the network 2 during a transmission operation. It should also be noted that in this drawing, the transmission/reception appliance 102 transmits and also receives the data. Alternatively, this transmission/reception appliance 102 may be arranged by separately employing a transmitter and also a receiver. The UIM card 118 corresponds to one sort of IC card which is detachably mounted on a portable telephone. Since the UIM card 118 stores thereinto subscriber information of a telephone and data such as a telephone directory, this card constitutes an IC card having such a purpose that the information related to the subscriber is carried in a separate manner with respect to a portable telephone. A portable telephone which mounts thereon the UIM card 118 may be utilized as a portable telephone of a user by substituting only the UIM card 118 by a card of another portable telephone, or an foreign portable telephone. In the present invention, the UIM card 118 further performs a signature producing/decoding process operation.

In an internal arrangement of the UIM card 118, a processor 120 is connected via an internal bus 119 to a storage apparatus 122 so as to transmit and receive control signals, data, and the like to each other. Electric power required for driving these components is supplied from the telephone 1. The storage apparatus 122 corresponds to an apparatus capable of storing thereinto information, and is, for example, a flash memory.

The storage apparatus 105 of the telephone 1 stores thereinto a program DB (database) 106, a telephone directory DB 108, and a telephone call receiving condition DB 109. The program DB 106 of the telephone 1 stores thereinto a telephone program 107 capable of realizing a telephone communication function having an authentication function. The telephone directory DB 108 stores a list of telephone numbers. The telephone call receiving condition DB 109 stores thereinto a telephone call receiving condition described later in detail.

The storage apparatus 122 of the UIM card 118 stores thereinto a program DB 123, a public certification 125, a secret key 126, a telephone number 127 of the telephone 1, and credit information 128 corresponding to credit card information of settlement. The program DB 123 stores thereinto a cryptograph program 124. Both the public certification 125 and the secret key 126 constitute one pair which is established based upon the public key cryptosystem. This public key cryptosystem is featured by that data which has been encrypted by one key can be decrypted by the other key, and is well known in this technical field, and therefore, explanations thereof are omitted.

Both the telephone program 107 and the cryptograph program 124 are stored into both the storage apparatus 105 and the storage apparatus 122 respectively by a reading apparatus (not shown in drawing) when both the telephone 1 and the UIM card 118 are manufactured. Alternatively, these telephone/cryptograph programs which have been stored in a storage medium such as a CD-ROM and have been transacted may be stored into the storage apparatus 105 and the storage apparatus 122 respectively by the reading apparatus (not shown). Alternatively, these telephone/cryptograph programs which have been transacted via the network 2 may be stored into the storage apparatus 105 and the storage apparatus 122 respectively by the reading apparatus (not shown). Both the telephone program 107 and the cryptograph program 124 are sequentially read out from the storage apparatus 105 and the storage apparatus 122 to be written into a work memory, which are then executed by the processor 104 of the telephone 1 and the processor 120 of the UIM card 118.

A telephone program 107 executed by the procession 104 is subdivided into the below-mentioned function blocks. That is, a telephone communication processing unit 110 executes a telephone calling/receiving process operation. A communication processing unit 111 executes a message transmitting/receiving process operation such as an e-mail. A cryptograph process unit 112 is constituted by a signature verifying unit 113 and a cryptographing process unit 114.

The signature verifying unit 113 verifies a signature, whereas the cryptographing process unit 114 performs a cryptographing process operation. A UIM process unit 115 controls the UIM card 118. A time instant acquiring unit 116 provides a present time instant to the respective components of program 107. A position acquiring unit 117 provides a present position to the respective component of the program 107.

A cryptographic program 124 performed by the processor 120 of the UIM card 118 is constituted by a function block, a signature calculating unit 121, and a decrypting process unit 129. The signature calculating unit 121 produces signature data by way of the secret key 126. The decrypting process unit 129 decrypts data which has been encrypted by the public certification 125 by using the secret key 126.

EMBODIMENT 1

Figure 3:
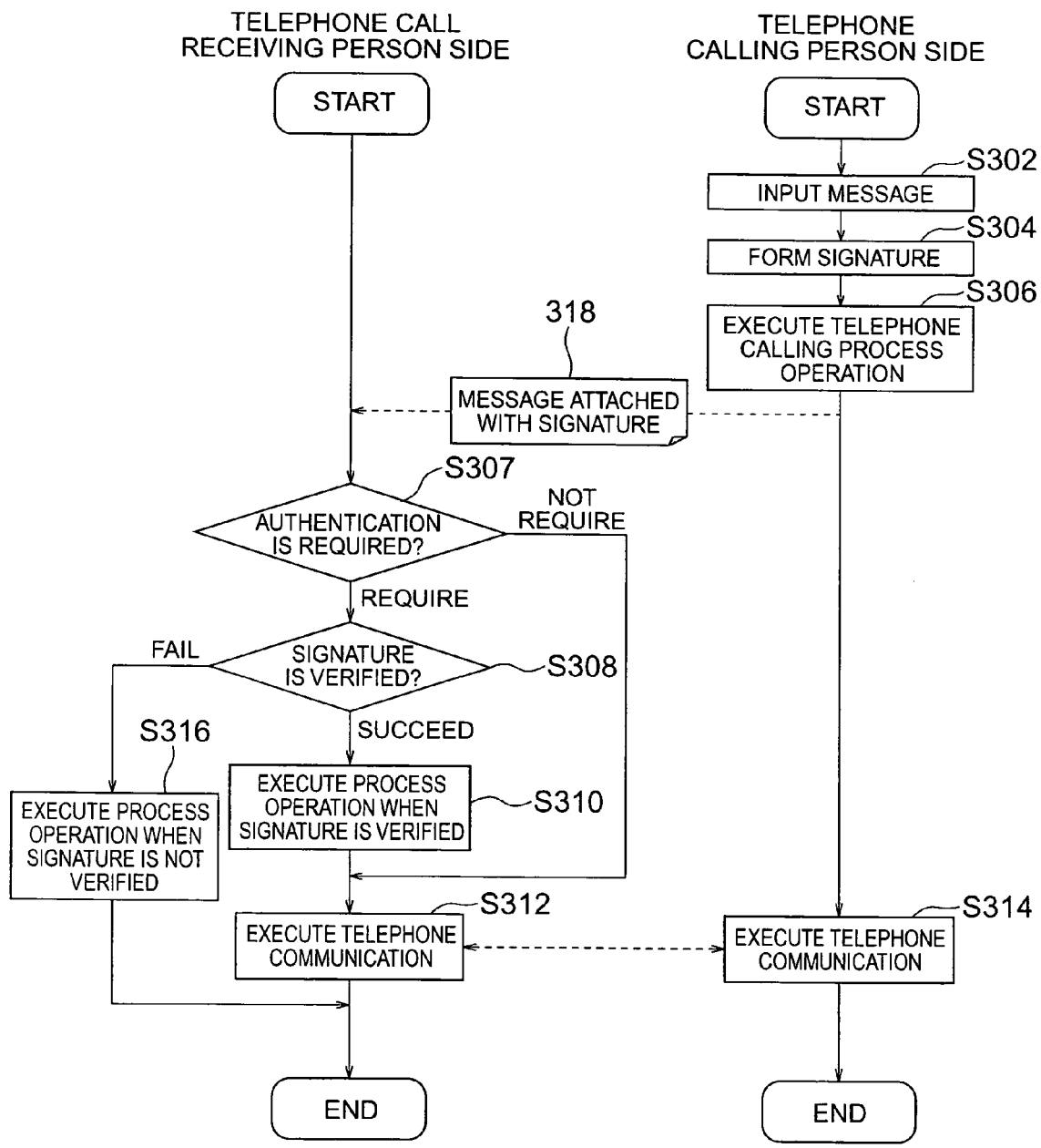
FIG. 3 is a flow chart for describing an execution sequence (embodiment 1) of the telephone system shown in FIG. 1.

Referring now to a flow chart of FIG. 3, operations of the telephone system according to an embodiment 1 will be described. In this embodiment 1, strict authentication of a telephone calling person can be carried out by such a way that the telephone calling person previously enters a message when a telephone call is made, and adds a signature of this telephone calling person to the message, and then, transmits the resulting message with the signature. Also, this message may be realized by not only such a message entered by a telephone calling person, but also either a telephone number 127 of the telephone 1 owned by the telephone calling person or data containing the telephone number 127.

When the telephone calling person performs a starting operation of a telephone communication attached with the signature by operating the input/output appliance 101, the telephone communication processing unit 111 displays an input screen of both the message and a password (step S302). FIG. 4 shows a display example of the input screen. Although the input of the password is exemplified in this embodiment 1, an individual confirmation process operation may be alternatively employed by utilizing biological authentication based upon, for example, a venous pattern of a finger of a telephone calling person, or the like. Also, in such a case that information as to whether or not signatures are required every telephone number of telephone calling destination has been previously stored in the telephone directory DB 108, when a telephone calling person selects a telephone number of a telephone calling destination which requires a signature, a password may be alternatively required to be entered. When the telephone communication processing unit 110 receives both a message and a password for using the UIM card 118 from the telephone calling person, the telephone communication processing unit 116 acquires a present time instant from the time instant acquiring unit 116, and then, supplies such a data made of coupling the message with the present time instant (will be referred to as "message attached with time instant" hereinafter) to the UIM processing unit 115. The UIM processing unit 115 firstly inputs the password into the UIM card 118 so as to be brought into such a condition that a signature process operation can be used. Next, the UIM processing unit 115 transmits the message attached with time instant to the UIM card 118. The signature calculating unit 121 off the UIM card 118 performs a signature producing operation with respect to the message attached to the time instant by employing the secret key 126, and then returns the produced signature to the UIM processing unit 115. The UIM processing unit 115 furthermore acquires the public certification 125 from the UIM card 118, and then, sets the message attached with the time instant, the signature, and the public certification 125 as a message attached with a signature 138, and thereafter, returns this message attached with the signature 138 to the telephone communication processing unit 110 (step S304). The telephone communication processing unit 110 transmits the message attached with the signature 318 in a telephone calling process operation to the telephone 1 on the side of a telephone call receiving person (step S306). In this embodiment 1, the message attached with the signature 318 has been formed based upon the message entered by the telephone calling person. Alternatively, the message attached with the signature 318 may be produced by making a signature based upon the telephone number 127 of the telephone 1 on the side of the telephone calling person.

In the telephone 1 on the side of the telephone call receiving person, the telephone communication processing unit 110 receives the message attached with the signature 318, and judges as to whether or not authentication is required in response to authentication require/not require as to the telephone call receiving condition of the telephone call receiving condition DB 109 (step S307). When the authentication is not required, the process operation is advanced to a step S312. To the contrary, when the authentication is required, the signature verifying unit 113 executes a signature verification as to the message attached with the signature 318 (step S308). In response to a verification result, the signature verifying unit 113 performs such an operation which is defined based upon the telephone call receiving condition stored in the telephone call receiving condition DB 109 (step S310 and Step S316). FIG. 5 indicates a definition example as to the telephone call receiving condition. FIG. 5 shows one example in which authentication require/not require, operations executed when authentication is required, and operations executed when authentication is not required are set every telephone number of a telephone calling source. In the step S316 defined when the signature verifying unit 113 fails in the signature verification, in such a case that the telephone calling condition corresponds to a rejection of a telephone call receiving operation, such a process operation may be alternatively carried out. That is, a notification for notifying that a telephone call is not accepted may be alternatively made with respect to the telephone 1 on the side of the telephone calling person.

Figure 6:
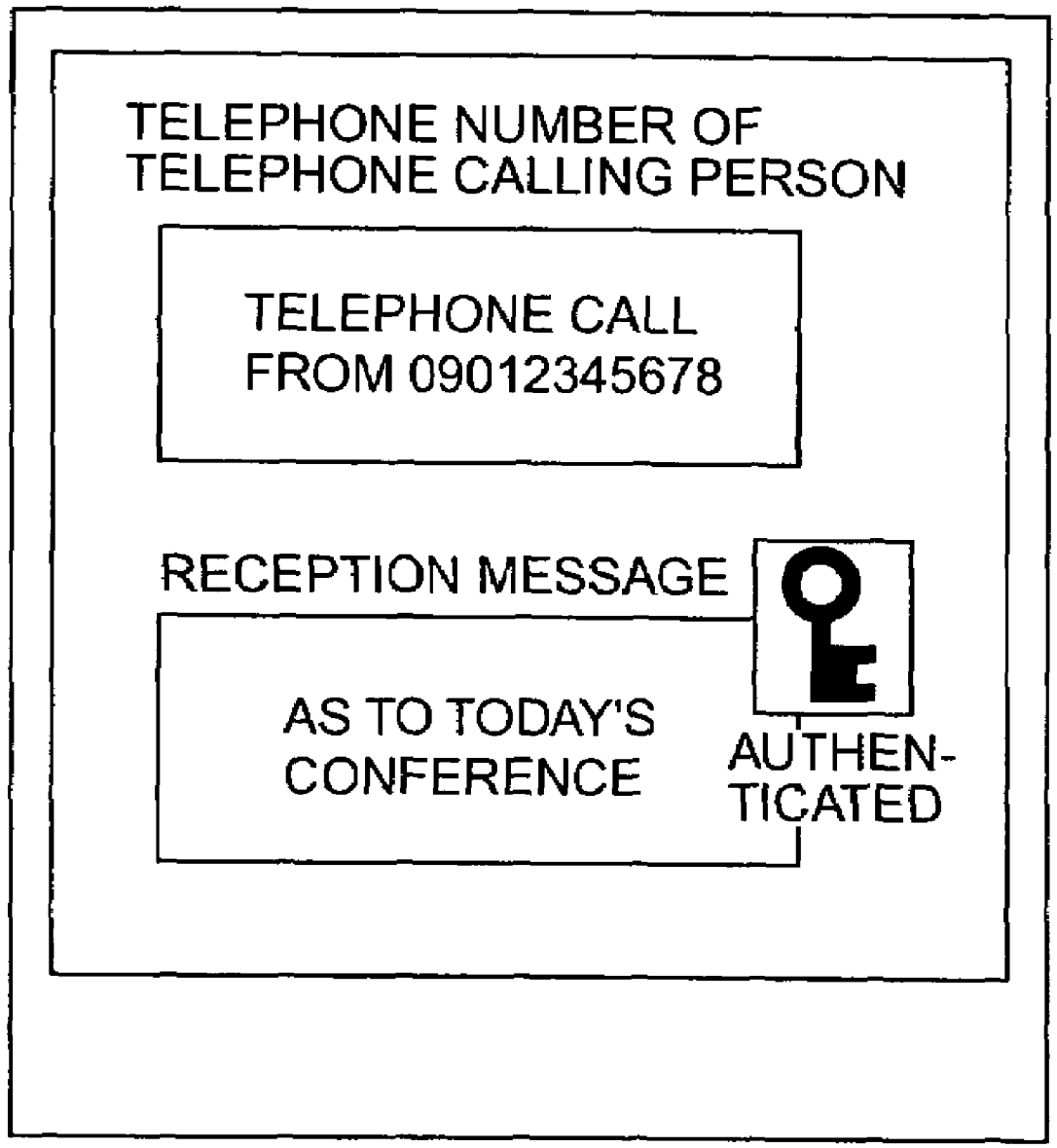
FIG. 6 is a diagram for showing a display screen example as to a telephone call receiving screen (embodiment 1).
Figure 9:
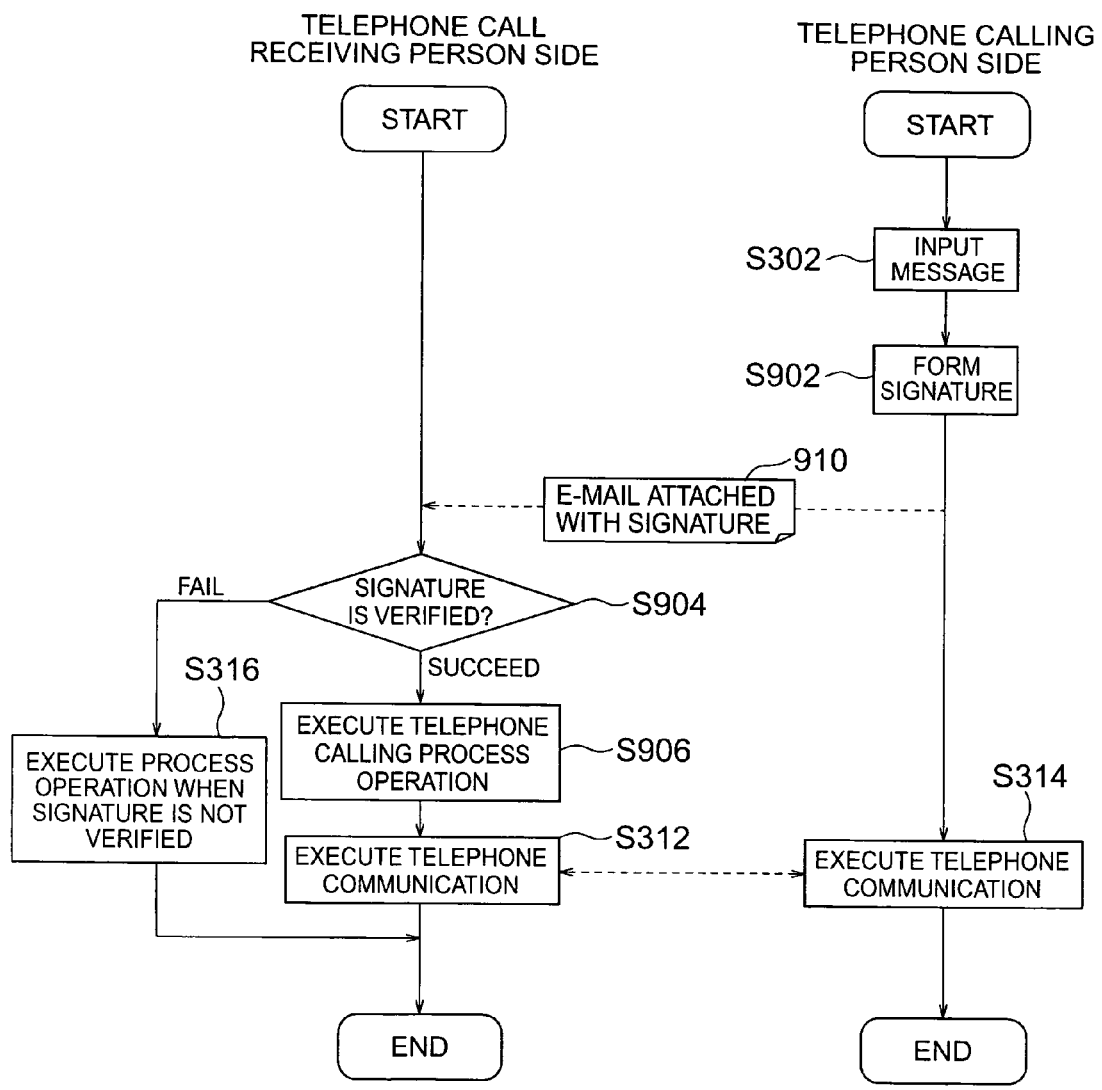
FIG. 9 is a flow chart for describing an execution sequence (embodiment 3) of the telephone system indicated in FIG. 1.

In the step S316 and the step S310, in the case that the telephone number of the telephone calling side corresponds to "09012345678", namely, when the set telephone calling condition corresponds to a telephone calling tone at an authentication and a telephone answering memorandum at a non-authentication, the telephone communication processing unit 110 derives the message from the message attached with the signature 318, and displays the message to the telephone call receiving person via the input/output appliance 101, and also, executes a telephone call receiving process operation. FIG. 6 indicates a display example when this telephone call receiving process operation is carried out. FIG. 6 represents a display example in the case that the signature verifying unit 113 can succeed in the signature verification. FIG. 9 indicates a telephone number of a telephone calling person, a content of a received message, and a mark as well as a character which represent that the content of this received message has been authenticated, during which a telephone receiving sound is produced. When the telephone call receiving person confirms the message and performs a telephone call receiving operation, a telephone communication is commenced (step S312 and step S314). After the telephone call receiving person has confirmed such authentication that the telephone calling person is a true (justified) telephone calling person, and the message sent by this telephone calling person is a true message by checking the display example of FIG. 6, the telephone call receiving person can commence the telephone communication. In the case that the operation executed when the authentication is carried out does not correspond to the telephone call receiving tone, but correspond to the telephone answering memorandum, the telephone communication processing unit 110 performs a process operation of the telephone answering memorandum, and further, stores the message attached with the signature 318 as a memorandum, so that the telephone call receiving person can confirm this message 318 later (step S310). Also, in this case, since a similar display content to that of FIG. 6 is made on the side of the telephone call receiving person, the telephone call receiving person can grasp such authentication that the telephone calling person who has made the telephone answering memorandum is true telephone calling person, and the content of this telephone answering memorandum is a telephone answering memorandum made by this true telephone calling person.

Also, in such a case that a normal telephone call without the message attached with the signature 318 is received, if the authentication require/not require of the telephone call receiving condition DB 109 corresponds to "require", then the signature verifying unit 113 judges that the signature verification fails in the step S308, and thus, the telephone 1 on the side of the telephone call receiving person executes operation when the authentication is not required based upon the telephone call receiving condition (step S316). In the case that the telephone number of the telephone calling source corresponds to "09012345678", no telephone communication is carried out, and the telephone calling person is required to input a message to the telephone answering memorandum.

On the other hand, if the authentication require/not require of the telephone call receiving condition DB 109 corresponds to "not require", as previously explained, then the process operation is advanced from the process operation of the step S307 to the process operation of the telephone communication (step S312), and thus, the telephone 1 on the side of the telephone call receiving person executes a telephone call receiving process operation based upon the telephone call receiving condition. Since this process operation is carried out, even when the telephone 1 on the side of the telephone calling person is operated by such a third party having no use right, the above-described message attached with the signature 318 of this embodiment 1 cannot be transmitted to the telephone 1 on the side of the telephone call receiving person. As a consequence, if the authentication require/not require of the telephone 1 on the side of the telephone call receiving person is set to "require", then the telephone call reception issued from the third party other than the true telephone calling person can be refused and/or restricted.

EMBODIMENT 2

Figure 7:
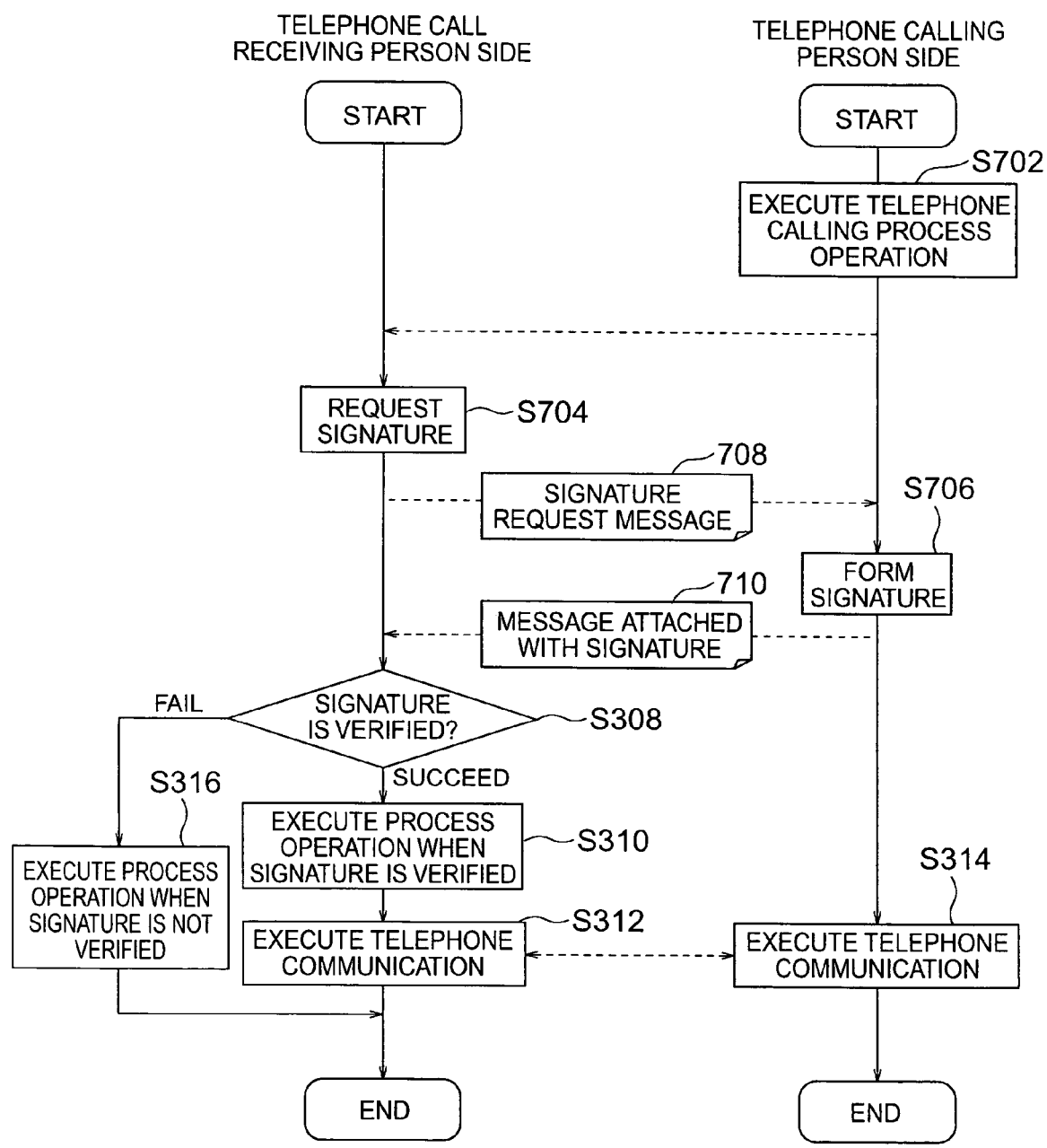
FIG. 7 is a flow chart for describing an execution sequence (embodiment 2) of the telephone system indicated in FIG. 1.

Referring now to a flow chart of FIG. 7, a description is made of operations of the telephone system according to an embodiment 2.

In this embodiment 2, the telephone 1 on the side of the telephone call receiving person requires a signature with respect to the telephone call issuing person. With respect to a telephone calling process operation by the telephone communication processing unit 110 of the telephone 1 on the side of the telephone calling person (step S702), when the telephone communication processing unit 110 of the telephone 1 on the side of the telephone call receiving person receives a call reception request, the telephone communication processing unit 110 derives a condition which has been stored in the telephone call receiving condition DB 109. In such a case that the condition as to the authentication require/not require for the condition corresponding to the telephone number 127 of the telephone calling person corresponds to "require", the telephone communication processing unit 110 acquires a present time instant from the time instant acquiring unit 116, and then, resends a signature request message 708 containing the acquired present time instant as cession information to the side of the telephone calling person (step S704).

When the telephone communication processing unit 110 on the side of the telephone calling person receives the signature request message 708, the telephone communication processing unit 110 displays an input screen of a password for using the UIM card 118. FIG. 8 represents an example of the input screen. Next, under control of the UIM processing unit 115, the signature calculating unit 121 of the UIM card 118 forms a signature with respect to the signature request message 708, and sets this formed signature as a message attached with a signature 710. The telephone communication processing unit 110 resends the message attached with the signature 710 to the side of the telephone call receiving person (step S706).

The telephone communication processing unit 110 on the side of the telephone call receiving person receives the message attached with the signature 710, and then, the signature verifying unit 113 verifies the message attached with the signature 710. The telephone communication processing unit 110 executes a telephone call receiving process operation in response to the verification result (step S308). Since process operations subsequent to this step S308 are similar to those of the above-explained embodiment 1, explanations thereof are omitted.

EMBODIMENT 3

Referring now to a flow chart of FIG. 9, a description is made of operations of the telephone system according to an embodiment 3.

In this embodiment 3, the telephone 1 on the side of the telephone call receiving person transmits a message attached with a signature to the telephone 1 on the side of the telephone call receiving person by employing another communication means different from a telephone communication, and then, a telephone calling process operation is carried out from the telephone 1 on the side of the telephone call receiving person. In this embodiment 3, such a sequential operation is represented. That is, in this sequential operation, a telephone calling person issues a telephone communication request to a free call center, or the like. In response to this telephone communication request, a telephone call is issued from the call center so as to charge a telephone call receiving person (call center).

When the telephone calling person operates to start a telephone communication attached with signature via the input/output appliance 101 (step S302), the signature calculating unit 121 of the UIM card 118 produces a message attached with signature 910 in accordance with a similar process operation to that of the embodiment 1 (step S902).

The message, a public certification 125, and a telephone number 127, which are entered by the telephone calling person, are contained in this message attached with signature 910. The telephone communication processing unit 110 transmits the e-mail attached with signature 910 via the transmitting/receiving appliance 102 to the telephone 1 on the side of the telephone call receiving person by operating the communication processing unit 111 (step S902). It should be understood that although the transmission of the e-mail attached with signature 910 is carried out by the e-mail transmitting means in this embodiment 3, the present invention is not limited thereto, but may be alternatively realized by a means capable of transmuting a message.

When the communication processing unit 11 on the side of the telephone call receiving person receives the e-mail attached with signature 910, the cryptograph processing unit 112 performs signature verification operation in a similar manner to that of the embodiment 1 (step S904). When the cryptograph processing unit 112 can succeed in the signature verification operation, the telephone communication processing unit 110 issues a telephone call to the telephone number 127 contained in the e-mail attached with signature 910 (step S906), and then commences a telephone communication (step S312 and step S314).

EMBODIMENT 4

Figure 10:
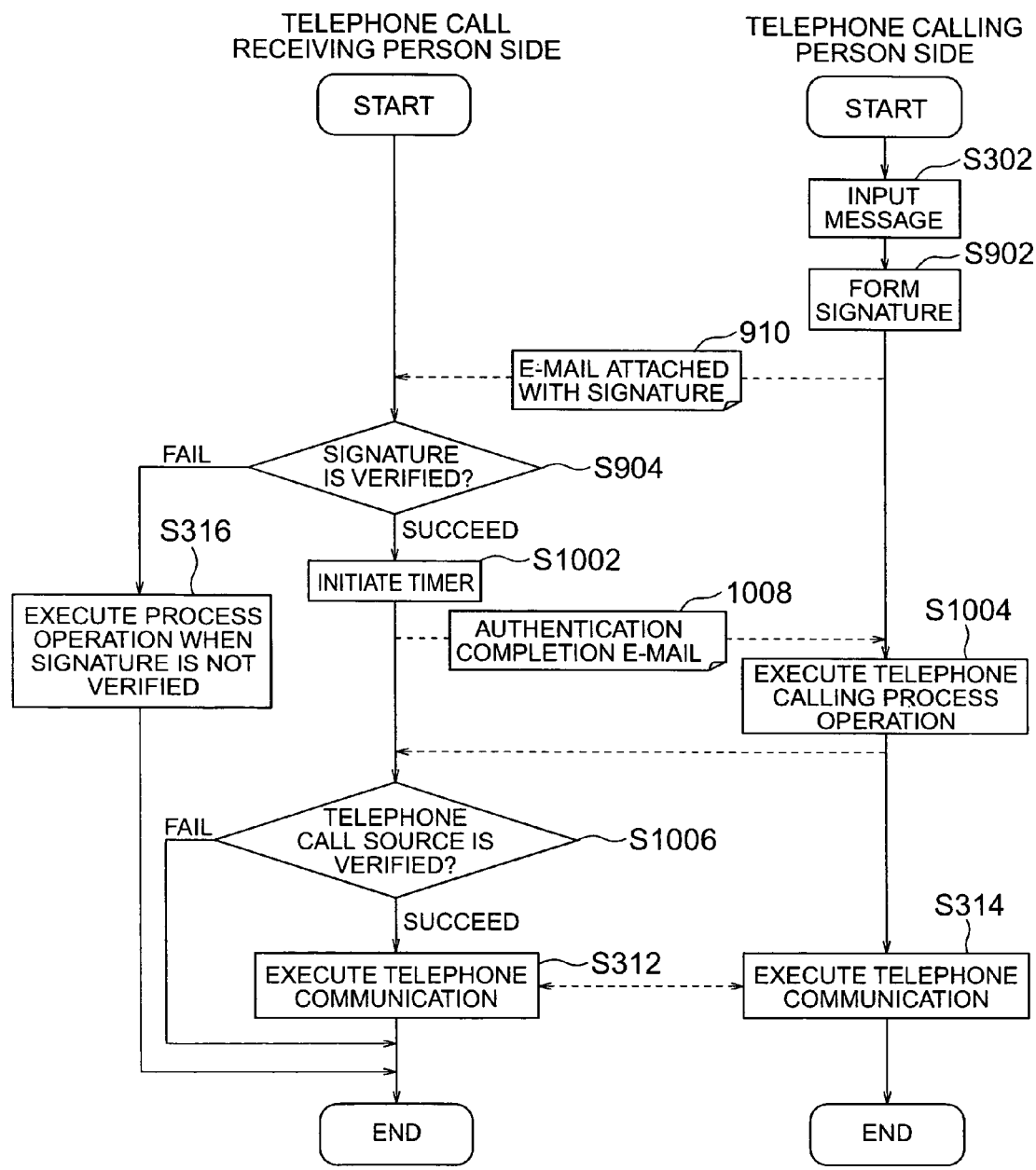
FIG. 10 is a flow chart for describing an execution sequence (embodiment 4) of the telephone system indicated in FIG. 1.

Referring now to a flow chart of FIG. 10, a description is made of operations of the telephone system according to an embodiment 4.

Similar to the embodiment 3, the telephone 1 on the side of the telephone call receiving person transmits an e-mail attached with signature 910 to the telephone 1 on the side of the telephone call receiving person by employing another communication means different from a telephone communication. However, a process operation after authentication executed in this embodiment 4 is different from that of the above-explained embodiment 3. Only the different process operation will be explained.

The communication processing unit 111 on the side of the telephone call receiving person receives the e-mail attached with signature 910 and executes a signature verification operation. When the communication processing unit 111 can succeed in the signature verification operation, after a timer (not shown) for a predetermined time has been set, the communication processing unit 111 resends an authentication completion message 1008 with respect to a transmission source address (namely, e-mail address in this embodiment 4) which is contained in the e-mail attached with signature 910 (step S1002). The telephone number 127 of the telephone 1 on the side of the telephone call receiving person is contained in the authentication completion e-mail 1008.

The communication processing unit 111 of the telephone 1 on the side of the telephone calling person, which has received the authentication completion e-mail 1008, performs a telephone call processing operation with respect to the telephone number 127 on the side of the telephone call receiving person, which is contained in the authentication completion e-mail 1008 (step S1004).

The telephone 1 on the side of the telephone call receiving person judges as to whether or not the received telephone number 127 is equal to one which has been sent by the e-mail message 1008, and also, is present within the timer setting time (step S1006). Only in such a case that the received telephone number 127 can satisfy these conditions, this telephone 1 executes a telephone call receiving process operation and performs a telephone communication (step S312 and step S314).

It should also be noted that in this embodiment 4, the authentication completion e-mail 1008 is transmitted in the step S1002 by the communication processing unit 111 on the side of the telephone call receiving person, and after the telephone 1 on the side of the telephone calling person has received the authentication completion e-mail 1008, this telephone 1 on the side of the telephone calling person executes the telephone calling process operation in the step S1004. Alternatively, while the communication processing unit 111 does not transmit the authentication completion e-mail 1008 in the step S1002, the telephone 1 on the telephone calling person may immediately perform the telephone calling process operation after the process operation of the step S902 (namely, after e-mail attached with signature 910 has been transmitted).

In this alternative case, after the telephone calling process operation has been carried out, the telephone 1 on the side of the telephone call receiving person may perform the process operation defined in the step S904. Alternatively, in this case, the following process sequence may be carried out. That is, such a message that the signature verification process operation is being carried out is supplied to the telephone 1 on the side of the telephone calling person so as to hold a telephone communication.

In this embodiment 4 shown in FIG. 10, since the e-mail attached with signature is transmitted, the telephone calling person himself can be certified, and also, the method capable of grasping the telephone member of the communication counter party to which the telephone call is wanted to be issued can be provided. Since the telephone call issuing destination (namely, telephone call receiving person) notifies the telephone number after the telephone calling person has been authenticated, the telephone call issuing destination can more firmly specify the telephone communication counter party.

EMBODIMENT 5

Figure 11:
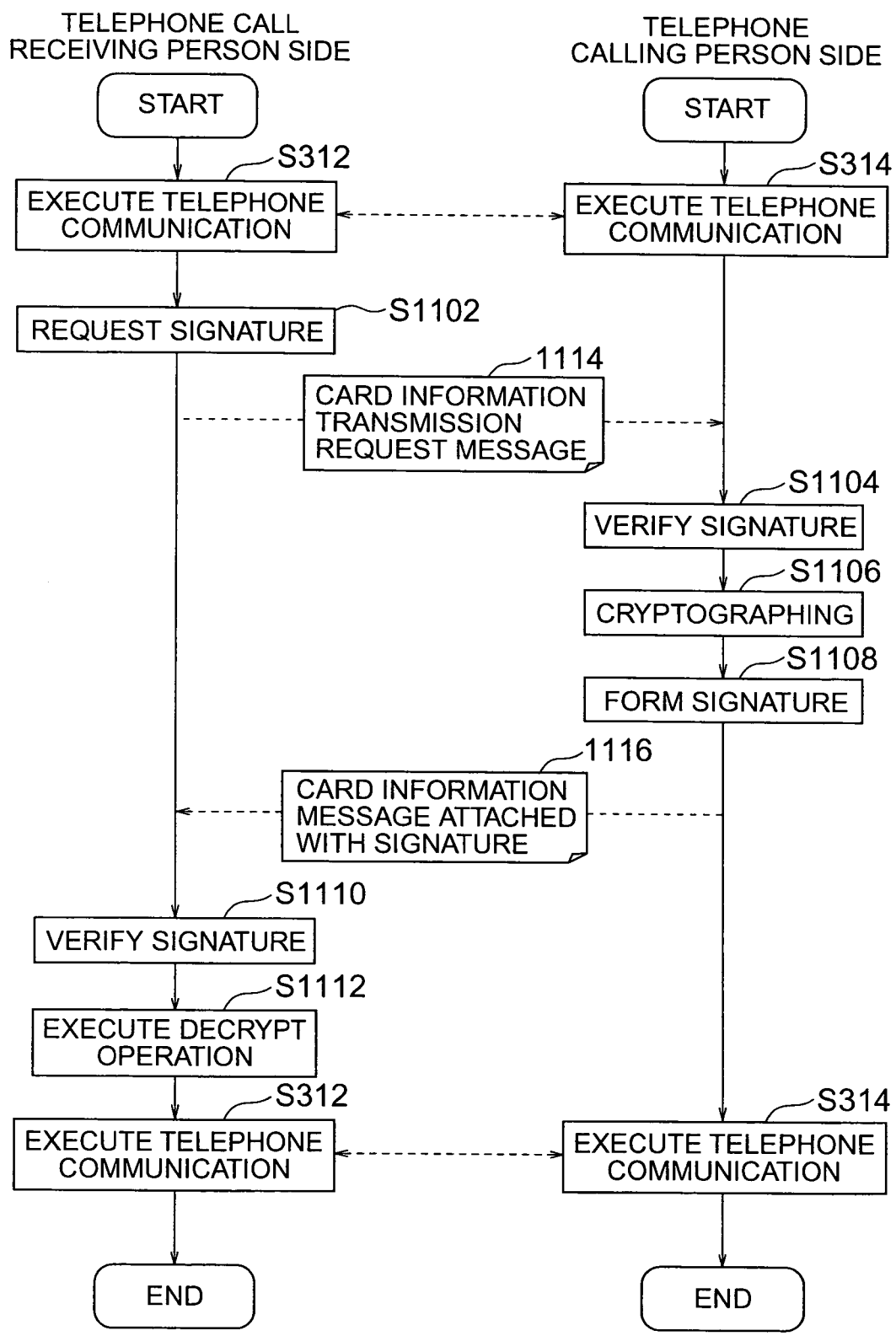
FIG. 11 is a flow chart for describing an execution sequence (embodiment 5) of the telephone system indicated in FIG. 1.

Referring now to a flow chart of FIG. 11, a description is made of operations of the telephone system according to an embodiment 5.

In this embodiment 5, while a telephone communication is made, an authentication process operation by way of a signature and a secret information transmission by way of crypto-system are carried out, if required.

While such a case that a telephone call receiving person requires credit information 128 under condition that both a telephone calling person and the telephone call receiving person are set to telephone communication condition is exemplified, a sequential operation thereof will now be explained.

When a need for requiring the credit information 128 is made during a telephone communication (step S312 and step S314), the telephone communication processing unit 110 accepts "signature request" based upon the operation input on the side of the telephone calling person, and then, instructs the UIM processing unit 115 to execute a producing process operation of a card information transmission request message 1114. A concrete process operation as to this instruction will now be explained. First of all, when the telephone communication processing unit 110 accepts the "signature request" entered by the telephone call receiving person, the UIM processing unit 115 acquires a public certification 125 from a UIM card 118. Next, a signature is produced with respect to such an information formed by coupling the public certification to the present time instant. The telephone communication processing unit 110 transmits such an information made by combining the present time instant, the public certification, and the signature as cession information to the telephone 1 on the side of the telephone calling person as a card information transmission request message 114 with each other (step S1102).

Figure 12:
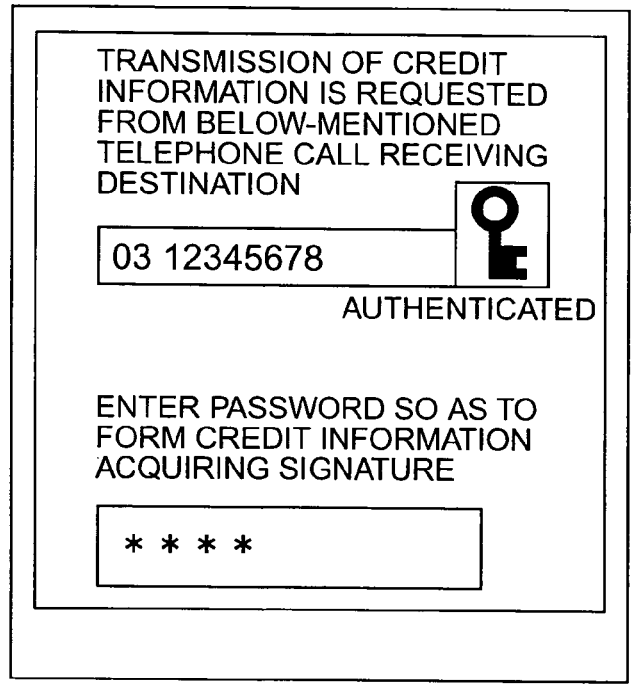
FIG. 12 is a diagram for illustratively showing a display screen example as to a credit information requesting screen (embodiment 5).

When the telephone communication processing unit 110 on the side of the telephone calling person receives the card information transmission request message 1114, the signature verifying unit 113 of the cryptograph processing unit 112 verifies a signature contained in this request message 1114 (step S1104). When the signature verifying unit 113 can succeed in the signature verification operation, the UIM processing unit 115 derives the credit information 128 from the UIM card 118, and the cryptographing process unit 114 of the cryptograph processing unit 112 encrypts the credit information 128 by using the public key of the public certification 125 which is contained in the card information transmission request message 1114 (step S1106). FIG. 12 shows an example of a screen which is displayed to the telephone calling person at this time.

In the case that the telephone calling person inputs a password on this display screen of FIG. 12, the UIM processing unit 115 instructs the UIM card 118 so as to form a signature with respect to such a data made by complying the encrypted message to the time instant contained in the card information transmission request message 1114, and a card information message attached with signature 116 is produced by the signature calculating unit 121 (step S1108). The card information message attached with signature 1116 is resent to the telephone call receiving person under control of the telephone communication processing unit 110.

Figure 13:
FIG. 13 is a diagram for illustratively showing another display screen example as to the credit information requesting screen (embodiment 5).

The telephone communication processing unit 110 of the telephone 1 on the side of the telephone call receiving person receives the card information message 1116 attached with signature 1116 and verifies the signature (step S1110), and thereafter, the UIM processing unit 115 instructs the UIM card 118 to decrypt the credit information 128 which has been encrypted. The decrypting process unit 129 of the UIM card 118 executes a decrypting process operation by using the secret key 126 (step S1112). The telephone communication processing unit 110 displays the credit information of the telephone calling person which has been decrypted via the input/output appliance 101 with respect to the telephone call receiving person. FIG. 13 indicates a display example of a screen.

Figure 14:
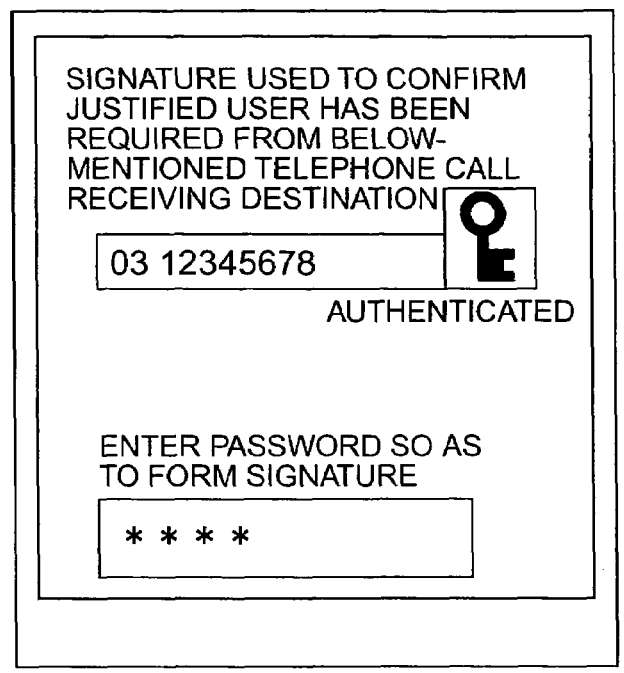
FIG. 14 is a diagram for illustratively indicating a display screen example of a signature requesting screen (embodiment 5).
Figure 15:
FIG. 15 is a diagram for showing a display screen example as to a signature receiving screen (embodiment 5).

In this embodiment 5, the telephone 1 on the side of the telephone call receiving person corresponds to the normal telephone. Alternatively, this telephone 1 may also be utilized in all of automatic response telephone systems, for example, a telephone banking system, in which although a telephone operator does not make an answer, a transaction is performed by an automatic response via a telephone. Also, in this embodiment 5, the signature request is issued from the telephone 1 on the side of the telephone call receiving person. Alternatively, the present invention may be applied to a system in which a signature request is issued from the telephone 1 on the side of the telephone calling person. Also, the present time instant is utilized as the information (cession information) used to specify a series of information transmission/reception in this embodiment 5. Alternatively, the present invention is not limited only thereto, but may be realized by such an information capable of specifying the cession. In this embodiment 5, the credit information 128 is transmitted. Alternatively, the present invention may be utilized in all systems for transmitting/receiving secret information. Further, the data request issued during the telephone communication, as indicated in this embodiment 5, may be alternatively utilized only in a utility capable of specifying a true telephone user during a telephone communication. FIG. 14 and FIG. 15 indicate display examples of screens in the step S1108 and the step S1110 as the examples utilized only to confirm the tree telephone user.

In this embodiment 5, the communication counter party during the telephone communication can be authenticated, and also, the true telephone users can mutually authenticate the counter parties with each other. Also, in such a case that a user on the side of the telephone calling person corresponds to such a person who has no use right (for example, illegal user), even if the person who has no use right can succeed in spending of the secret information such as the credit information 128, this person having no use right cannot transmit the card information message attached with signature 1116 which is made by the signature function of the UIM card 118. As a result, the telephone call receiving person such as a credit company can firmly prevent the illegal use.

EMBODIMENT 6

Figure 16:
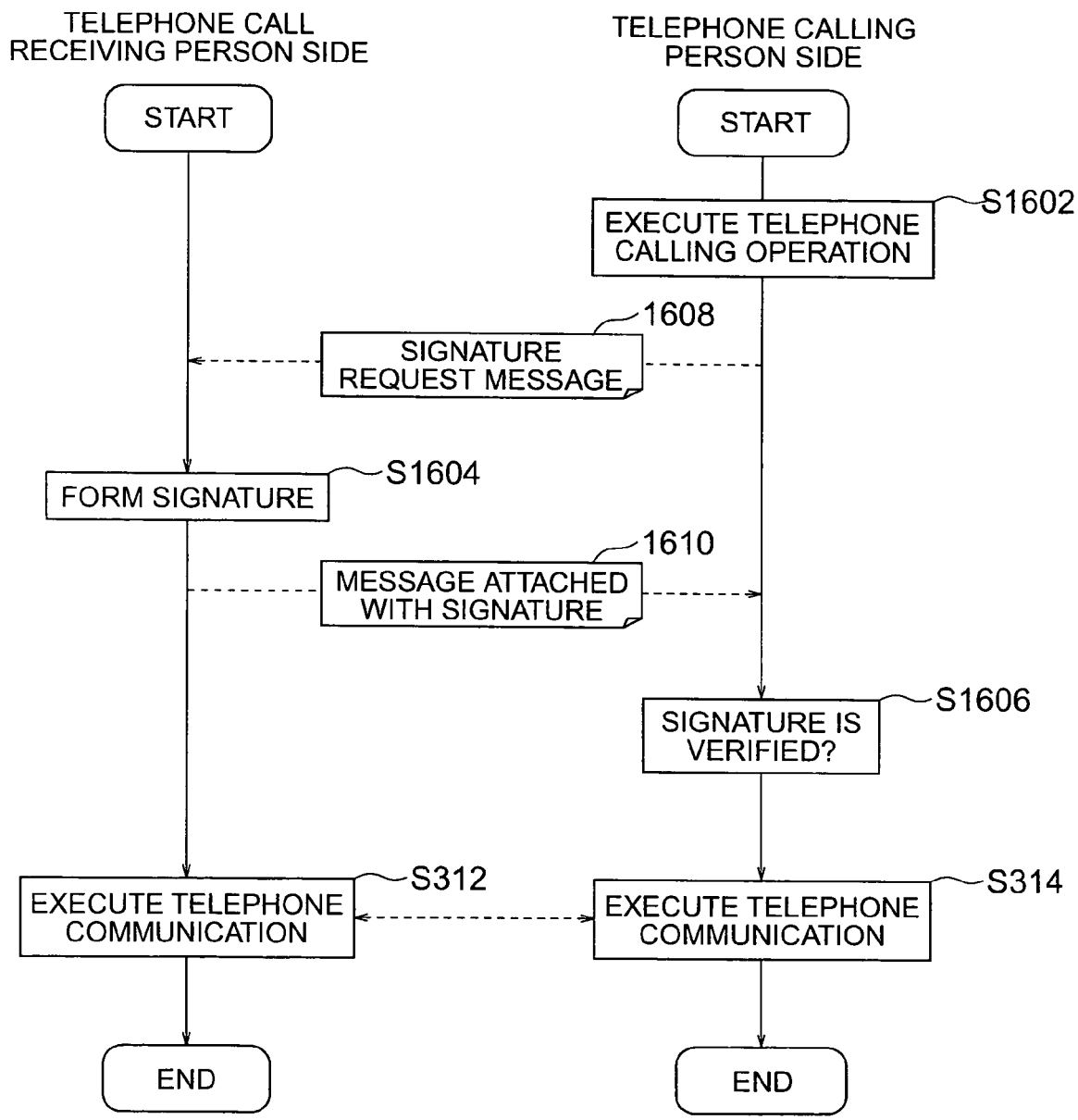
FIG. 16 is a flow chart for describing an execution sequence (embodiment 6) of the telephone system indicated in FIG. 1.

Referring now to a flow chart of FIG. 16, a description is made of operations of the telephone system according to an embodiment 6.

In this embodiment 6, a telephone call receiving person of a telephone communication designates a telephone call receiving operation by a true (justified) user of a telephone 1 on the side of a telephone call receiving person.

When the telephone calling person performs a telephone calling operation, the telephone communication processing unit 110 transmits a signature request message 1068 (step S1602). If the authentication require/not require information has been registered in the telephone directory DB 108 of the telephone 1 on the side of the telephone calling person, then the transmission of the signature request message 1608 can be automatically carried out in combination with the telephone calling process operation defined in the step S1602. This authentication require/not require information is used to check as to whether or not a communication counter party of a telephone calling destination every telephone number of the telephone calling destination corresponds to a true telephone call receiving person.

The telephone communication processing unit 110 of the telephone 1 on the side of the telephone call receiving person receives the signature request message 1608, and the UIM processing unit 115 produces a signature based upon the present time instant, and then, the telephone communication processing unit 110 resends the resulting message as a message attached with signature 1610 to the telephone 1 on the side of the telephone calling person. The telephone communication processing unit 110 of the telephone 1 on the side of the telephone calling person, which has received the message attached with signature 1610, instructs the signature verifying unit 113 of the cryptograph processing unit 112 to verify the signature (step S1606), and then, commences a telephone communication only in such a case that the signature verification can succeed (step S312 and step S314).

In both the telephone 1 and the telephone system, according to this embodiment 6, when the telephone calling process operation of the telephone communication is carried out, or while the telephone communication is carried out, the telephone communication subject persons can be strictly authenticated. Also, the secret information can be transmitted/received. Furthermore, the telephone number can be notified in a safety manner.

In this embodiment 6, the telephone 1 has been employed. However, the present invention is not limited only this telephone 1, but may be alternatively realized by using all sorts of information processing terminals capable of performing communications/telephone communications. Also, this embodiment 6 exemplifies that the signature processing operation is carried out by the UIM card 118. Alternatively, the functions executed by the UIM card 118 may be owned by the telephone 1 itself.

The present invention may be applied to all sorts of communication systems which contain portable information terminals, portable telephones, telephone service response terminals, and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing terminal comprising:
a communication processing unit for performing a communication operation with respect to an appliance having been connected with the information processing terminal through a network, wherein said communication processing unit includes an authenticating operation operable both where the authenticating operation is performed before communication, and where the authenticating operation is performed responsive to a request for authentication; and
a signature calculating unit in which when a communication with respect to said appliance is carried out and authentication is needed, a signature using a secret key for authenticating an appropriate operator for the information processing terminal is produced by a calculation processing unit provided within the signature calculating unit;
wherein:
said communication processing unit transmits information attached with the signature produced by the signature calculating unit to said appliance;
said information processing terminal further comprising an appliance authentication verifying unit configured to receive a message with a signature back from the appliance, and to verify authentication of the user of the appliance via the message with the signature;
communication between the information processing terminal and the appliance is allowed if authentication is accepted at the appliance and the information processing terminal; and
before a telephone communication calling process operation to said appliance is commenced, said telephone communication processing unit transmits said information attached to the signature to said appliance.

2. An information processing terminal as claimed in claim 1 wherein:
an operation by said signature calculating unit is carried out by a detachable device for authenticating a true user of said information processing terminal.

3. An information processing terminal as claimed in claim 1 wherein:
said information attached with signature corresponds to an electronic mail; and
after said information attached with signature has been transmitted by said communication processing unit to said appliance, the telephone communication is commenced if authentication is accepted at the appliance and the information processing terminal.

4. An information processing terminal comprising:
a communication processing unit for performing a communication operation with respect to an appliance having been connected with the information processing terminal through a network, wherein said communication processing unit includes, for each subject appliance of a plurality of appliances, appliance settings allowing definition of: whether authentication is required or not required for the subject appliance; operations executed when authentication is performed; and operations executed when authentication is not performed; and
a signature verifying unit in which when the appliance settings for the appliance indicate that authentication is required and information attached with signature using a secret key for authenticating an appropriate operator for the appliance, is received from the appliance on the side of a telephone calling person, a verification processing operation of the signature as to said information attached to signature is carried out by a calculation processing unit provided within the signature verifying unit; wherein:
in such a case that the appliance settings for the appliance indicate that authentication is required, and a telephone calling person is authenticated by said signature verifying unit using the signature, a telephone call receiving process operation is subsequently conducted using the appliance settings for the appliance, which define operations executed when authentication is performed; and
in such a case that the appliance settings indicate that authentication is required, and a telephone calling person is not authenticated by said signature verifying unit using the signature, a telephone call receiving process is subsequently conducted using the appliance settings for the appliance, which define operations executed when authentication is not performed; and
in the case that the telephone calling person is authenticated by said signature verifying unit using the signature, displaying an indication verifying authentication and allowing a communication.

5. An information processing terminal as claimed in claim 4 wherein:
in the case that the telephone calling person is authenticated by said signature verifying unit, such a message that the telephone calling person has already been authenticated is displayed on a display screen.

6. An information processing terminal as claimed in claim 4 wherein:
said communication processing unit owns a function capable of transmitting a signature request message to an appliance provided on the side of the telephone calling person in such a case that said communication processing unit receives a telephone call without information attached with signature from the appliance on the side of the telephone calling person.

7. An information processing terminal as claimed in claim 4 wherein:
said information attached with signature corresponds to an electronic mail, and contains a telephone number on the side of the telephone calling person; and
said information processing terminal owns a function capable of performing a telephone calling process operation with respect to the telephone number contained in said information attached to signature in such a case that signature verification of said information attached with signature can succeed.

8. An information processing terminal as claimed in claim 4 wherein:
said information attached with signature corresponds to an electronic mail; and
said information processing terminal is comprised of:
a function capable of transmitting an electronic mail of an authentication completion which contains a telephone number of the telephone call receiving person in the case that signature verification of said information attached with signature succeeds; and
a function capable of commencing a telephone communication in the case that a telephone call issued from the appliance on the side of said telephone calling person is received within a predetermined time.

9. An information processing terminal comprising:
a communication processing unit for performing a communication operation with respect to another appliance having been connected with the information processing terminal through a network, wherein said communication processing unit includes an authenticating operation operable both where the authenticating operation is performed before communication, and where the authenticating operation is performed responsive to a request for authentication, and wherein said communication processing unit includes, for each subject appliance of a plurality of appliances, appliance settings allowing definition of: whether authentication is required or not required for the subject appliance; operations executed when authentication is performed; and operations executed when authentication is not performed;
a signature calculating unit in which when a request for confirming a true user as to a user of said appliance is accepted by an input/output unit while a telephone communication is carried out with respect to said appliance, a signature by using a secret key is produced by said calculation processing unit, and said signature calculating unit produces information equal to a message for requesting a confirmation of the true user so as to form an information request message attached with signature where said signature has been attached to said information;
said communication processing unit transmits the information attached with the signature produced by the signature calculating unit to said appliance;
a signature verifying unit in which when the appliance settings for the appliance indicate that authentication is required and information attached with signature where the signature has been added to said information, is received from said appliance, a verification processing operation of the signature is carried out by a calculation processing unit provided within the signature verifying unit;
wherein:
in such a case that the appliance settings for the appliance indicate that authentication is required, and a telephone calling person is authenticated by said signature verifying unit using the signature, a telephone call receiving process operation is subsequently conducted using the appliance settings for the appliance, which define operations executed when authentication is performed; and
in such a case that the appliance settings indicate that authentication is required, and a telephone calling person is not authenticated by said signature verifying unit using the signature, a telephone call receiving process is subsequently conducted using the appliance settings for the appliance, which define operations executed when authentication is not performed; and
in the case that the telephone calling person is authenticated by said signature verifying unit using the signature, displaying an indication verifying authentication and allowing a communication.

10. An information processing terminal as claimed in claim 9 wherein:
the process operation by said signature calculating unit is carried out by a detachable device for authenticating a true user of said information processing terminal.

11. An information processing terminal as claimed in claim 9 wherein:
said information attached with signature contains personal data of said true user.

12. An information processing terminal comprising:
a communication processing unit for performing a communication operation with respect to an appliance having been connected with the information processing terminal through a network, wherein said communication processing unit includes an authenticating operation operable both where the authenticating operation is performed before communication, and where the authenticating operation is performed responsive to a request for authentication; and
a signature calculating unit in which when a communication with respect to said appliance is carried out and authentication is needed, a signature using a secret key for authenticating an appropriate operator for the information processing terminal is produced by a calculation processing unit provided within the signature calculating unit;
wherein:
said communication processing unit transmits information attached with the signature produced by the signature calculating unit to said appliance;
said information processing terminal further comprising an appliance authentication verifying unit configured to receive a message with a signature back from the appliance, and to verify authentication of the user of the appliance via the message with the signature;
communication between the information processing terminal and the appliance is allowed if authentication is accepted at the appliance and the information processing terminal; and
in a case that signature request information is received from said appliance after a telephone communication calling process operation to said appliance has been commenced, said signature calculating unit produces the information attached with signature based upon said received signature request information.

13. An information processing terminal as claimed in claim 12 wherein:
an operation by said signature calculating unit is carried out by a detachable device for authenticating a true user of said information processing terminal.

14. An information processing terminal as claimed in claim 12 wherein:
said information attached with signature corresponds to an electronic mail; and
after said information attached with signature has been transmitted by said communication processing unit to said appliance, the telephone communication is commenced if authentication is accepted at the appliance and the information processing terminal.

* * * * *